US008984101B1

(12) United States Patent
Viswanath et al.

(10) Patent No.: US 8,984,101 B1
(45) Date of Patent: Mar. 17, 2015

(54) SYSTEM AND METHOD FOR MODEL-BASED CONFIGURATION OF A SERVER CLUSTER

(75) Inventors: Sridatta Viswanath, Santa Clara, CA (US); Michael C. Hulton, Sunnyvale, CA (US); Kenneth Ebbs, Los Altos, CA (US); Abhijit Kumar, Sunnyvale, CA (US); Akm N. Islam, Santa Clara, CA (US)

(73) Assignee: Oracle America Inc., Redwood City, CA (US)

( * ) Notice: Subject to any disclaimer, the term of this patent is extended or adjusted under 35 U.S.C. 154(b) by 1676 days.

(21) Appl. No.: 10/787,468

(22) Filed: Feb. 26, 2004

(51) Int. Cl.
*G06F 15/177* (2006.01)
*G06F 15/173* (2006.01)

(52) U.S. Cl.
USPC .......................................... 709/220; 709/223

(58) Field of Classification Search
USPC ......................................................... 709/220
See application file for complete search history.

(56) References Cited

U.S. PATENT DOCUMENTS

| 6,484,276 | B1 * | 11/2002 | Singh et al. ...................... 714/41 |
| 6,801,949 | B1 * | 10/2004 | Bruck et al. ................... 709/232 |
| 6,865,737 | B1 | 3/2005 | Lucas et al. |
| 7,181,462 | B2 * | 2/2007 | Shalabi et al. ................ 707/102 |
| 7,194,480 | B2 * | 3/2007 | Shalabi et al. ............ 707/103 R |
| 7,206,827 | B2 * | 4/2007 | Viswanath et al. ........... 709/220 |
| 7,222,255 | B1 * | 5/2007 | Claessens et al. ................ 714/4 |
| 7,254,624 | B2 * | 8/2007 | Kinyon et al. ................. 709/220 |
| 7,363,361 | B2 * | 4/2008 | Tewari et al. .................. 709/223 |
| 7,401,259 | B2 * | 7/2008 | Bhowmik et al. ................ 714/31 |
| 7,406,473 | B1 * | 7/2008 | Brassow et al. .................. 707/10 |
| 7,469,279 | B1 * | 12/2008 | Stamler et al. ................. 709/221 |
| 2002/0052942 | A1 * | 5/2002 | Swildens et al. .............. 709/223 |
| 2002/0103994 | A1 * | 8/2002 | Morrison et al. .................. 713/1 |
| 2002/0161688 | A1 * | 10/2002 | Stewart et al. ................... 705/37 |
| 2003/0065763 | A1 * | 4/2003 | Swildens et al. .............. 709/224 |
| 2003/0097564 | A1 * | 5/2003 | Tewari et al. .................. 713/171 |
| 2004/0199815 | A1 * | 10/2004 | Dinker et al. .................... 714/21 |
| 2004/0260982 | A1 * | 12/2004 | Bhowmik et al. ................ 714/43 |

OTHER PUBLICATIONS

BEA; BEA WebLogic Server and BEA WebLogic Express Administration Guide; Jun. 24, 2002; Version 6.1; 6 pages total; Pertinent 4-1, 4-2, 4-3, 4-4.*
"Server Project," IBM Corporation, 2000, (1 Page).
(Continued)

*Primary Examiner* — Richard G Keehn
(74) *Attorney, Agent, or Firm* — Robert C. Kowert; Meyertons, Hood, Kivlin, Kowert & Goetzel, P.C.

(57) ABSTRACT

A system and method for configuring servers in a cluster. The method may include storing one or more base configuration files associated with an application in a domain administration server, deploying the base configuration files onto one or more servers in a cluster of servers, making one or more instance-specific modifications to the base configuration files, and executing the application in accordance with the one or more modified base configuration files. In various embodiments, the base configuration files may be XML files, and the modifications may be xpath expressions. An alternate embodiment of the method may include storing one or more configuration files based on a common template and representing a platform-specific configuration of a server in a domain administration server, deploying the configuration files onto one or more servers in a cluster of servers, and configuring the servers in accordance with the configuration files.

32 Claims, 6 Drawing Sheets

(56) References Cited

OTHER PUBLICATIONS

An et al., "WebSphere and DB2 Clustering and Scalability Study—Installation and Configuration Guide,"International Business Machines Corporation, 2002, (19 pages).

Dave Cavallero, "Integrated Technology Lets Business and IT Collaborate to Improve Business Results," IBM Software Group, Jun. 2003, (14 pages).

James Hart, "Connecting Your Applications without Complex Programming," IBM Software Group, Sep. 2003, (23 pages).

"BEA Weblogic Server 8.1 Overview—The Foundation for Enterprise Application Infrastructure," BEA White Paper, Aug. 19, 2003, (40 pages).

"BEAWeblogic Server—Using Web Logic Server Clusters," Version 8.1, BEA Systems, Inc., Oct. 20, 2003.

* cited by examiner

SYSTEM AND METHOD FOR MODEL-BASED CONFIGURATION OF A SERVER CLUSTER

BACKGROUND OF THE INVENTION

1. Field of the Invention

This invention relates to the field of clustered computer systems and, more particularly, to configuring clustered computer systems.

2. Description of the Related Art

As web-based applications become more important to business and industry, system failure becomes more expensive, and highly reliable systems assume a greater importance. For example, a web site may handle financial, production, sales, marketing or media applications. Failure to provide these applications to clients for even a few minutes could mean thousands or millions of dollars in lost income.

One way to provide applications on a highly reliable basis is a distributed system with a plurality of redundant components. In a distributed system, a plurality of servers may be connected by a load balancer and a network. In some embodiments, servers may be grouped into one or more clusters of servers. Each cluster may be operable to execute an instance, or copy, of the same application on one or more servers. The load balancer may be operable to serve requests to each instance of the application so that each server has approximately the same overall workload.

One or more servers may execute on a single computer system, or node, in a distributed system. Furthermore, different nodes in a distributed system may be of different architectures. For example, a cluster may be comprised of both Solaris and Linux nodes. In addition, different servers executing on the same node may be part of different clusters.

Traditional management of configuration for software, hardware, and server clustering may rely on repeated manual operations, each of which may or may not require subtle changes. For example, each instance of an application on a cluster may need to be individually compiled, deployed and verified for each server, although each application instances may be substantially similar. In one example, a minor change made between the compilation of different instances may make a major differences between the instances themselves, thereby breaking compatibility between instances.

In addition, small changes may need to be made between different hardware or software deployments. For example, two instances of an application executing on two different servers which in turn execute on the same node may not be able to share the same network port parameter. In a large distributed system the network port parameters in hundreds of configuration files may need to be manually changed. However, manually accessing and modifying hundreds of configuration files may prove both time-consuming and error-prone.

SUMMARY

A system and method for configuring servers in a cluster is disclosed. The method may include storing one or more base configuration files associated with an application in a domain administration server, deploying the base configuration files onto one or more servers in a cluster of servers, making one or more instance-specific modifications to the base configuration files, and executing the application in accordance with the one or more modified base configuration files. In various embodiments, the base configuration files may be XML files, and the modifications may be xpath expressions. An alternate embodiment of the method may include storing one or more configuration files based on a common template and representing a platform-specific configuration of a server in a domain administration server, deploying the configuration files onto one or more servers in a cluster of servers, and configuring the servers in accordance with the configuration files.

Figure 1:
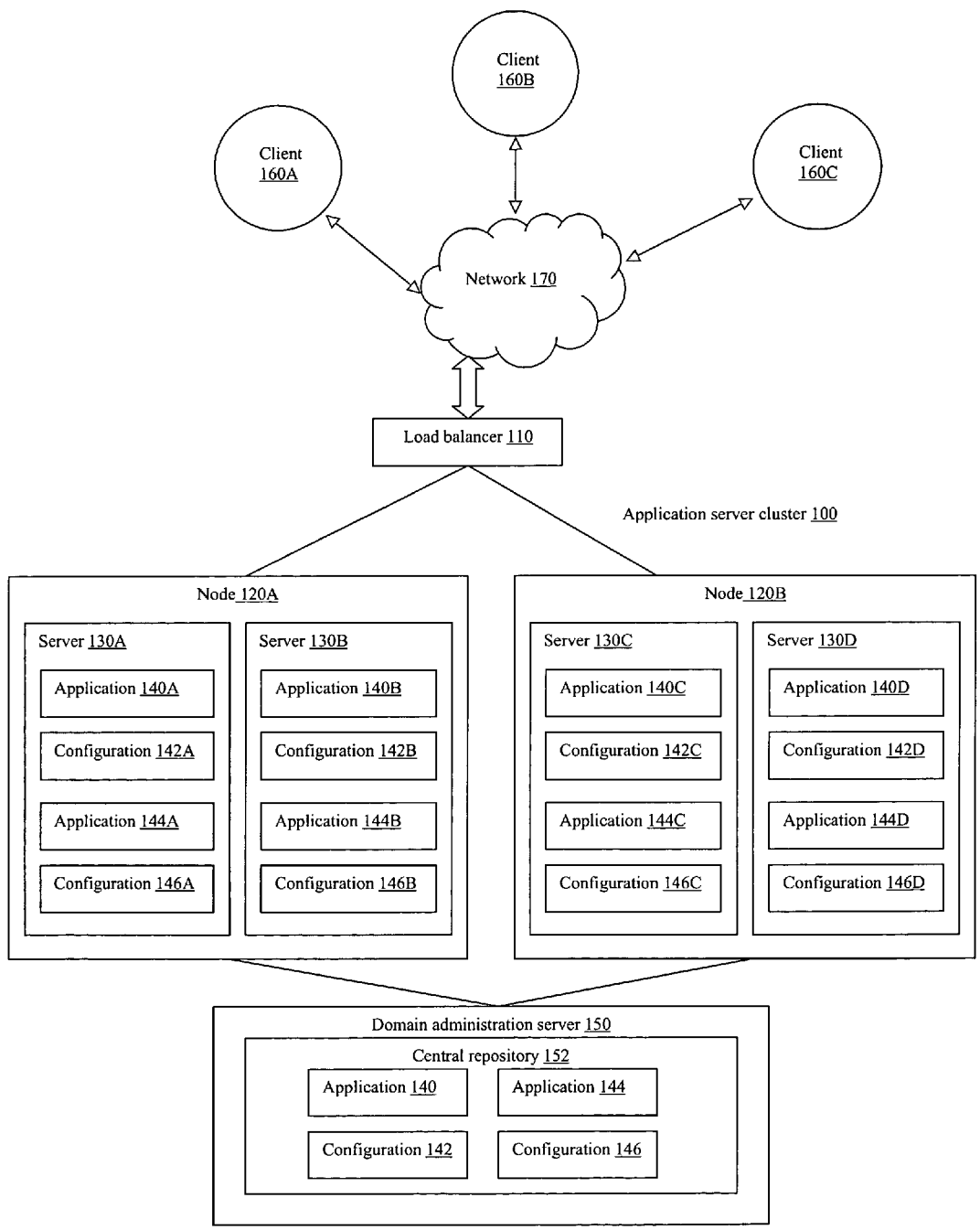
FIG. 1 is a block diagram of a distributed system, according to one embodiment.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

FIG. 1 illustrates a block diagram of an exemplary application server cluster 100. Application server cluster 100 contains a load balancer 110, which is coupled to a plurality of nodes 120A-B, each of which includes one or more servers 130A-D. Load balancer 110 is also coupled to clients 160A-C via network 170, and each server 130A-D is also coupled to domain administration server 150.

Network 170 may be a local area network (LAN), a wide area network (WAN), the Internet, system backplane(s), other type of communication medium, or a combination thereof. Network 170 may be operable to transmit requests for various application services from clients 160A-C to application server cluster 100, and to transmit application responses from application server cluster 100 to clients 160A-C.

Load balancer 110 is operable to receive requests from clients 160A-C. Load balancer 110 may be operable to forward the requests in a balanced manner to servers 130A-D, so that each instance of a given application on servers 130A-D receives approximately the same overall workload and/or number of requests. Load balancer 110 may further be operable to receive responses generated by servers 130A-D, and forward these responses back to the appropriate clients 160A-C.

Each node 120A-B may be a separate hardware system with one or more independent processors, memory, network interfaces and power supplies, as will be described below. Each node 120A-B may be operable to execute one or more software servers 130A-D. In one embodiment, servers 130A-D may be operable to provide an execution environment for various application components, as will be described further below.

Each server 130A-C may contain a copy of application components 140A-D, and 144A-D, and of their respective configuration files 142A-D and 146A-D. Each server 130A-C may be operable to provide an execution environment for application components 140A-D and 144A-D, according to the configuration expressed in configuration files 142A-D and 146A-D, as will be described below.

Application components 140-D and 144A-D may include Java Beans or any other kind of application component. In various embodiments, each application component 140A-D or 144A-D may be operable to provide e-commerce, database access, remote configuration, or any other kind of network or web-based application functionality. Configuration files 142A-D and 146A-D may contain various information related to the operation and deployment of servers 130A-D and applications 140A-D and 144A-D, respectively, as will be described in further detail below.

Domain administration server 150 may run on a separate hardware system with one or more independent processors, memory, network interfaces and power supplies, similar to nodes 120A-B. Domain administration server may further be connected to nodes 120A-B and servers 130A-D via one or more network connections. In other embodiments, domain administration server 150 may be implemented on the same node as one of the servers of the cluster 100. Domain administration server 150 may be operable to execute a method for deploying one or more application instances and/or configurations onto servers 130A-D, as will be described below in further detail.

Domain administration server 150 may manage central repository 152. Central repository 152 may be operable to store one or more applications 140 and 144 and configuration files 142 and 146. Each application 140 and 144 may correspond to a compiled and assembled copy of an application instance 140A-D or 144A-D on servers 130A-D. Likewise, configuration files 142 and 146 may be pre-deployment versions of configuration files 142A-D and 146A-D, as will be described in further detail below.

In one embodiment, domain administration server 150 may be used as a central point of configuration and deployment for one or more application server clusters 100. Specifically, domain administration server 150 may be operable to store one or more server configurations in central repository 152 and deploy the one or more configurations onto servers 130A-D. Domain administration server 150 may further be operable to update the deployed configurations from a central location, create and manage arbitrary aggregations of servers, and reuse "known good" server configurations, as will be described in further detail below.

It is noted that many of the details in FIG. 1 are purely illustrative, and that other embodiments are possible. For example, the number of load balancers 110, nodes 120, servers 130, applications 140 and 144 and configuration files 142 and 146 is purely illustrative. Application server cluster 100 may have any number of load balancers 110, nodes 120, servers 130, applications 140, 144 or configuration files 142 and 146. In some embodiments, load balancer 110 may be implemented on one or more of nodes 120A-B. Furthermore, in some embodiments each server 130A-D may be located on a separate node 120. In one embodiment, servers 130A-D on the same node 120A-B may share a single configuration file per application, while in other embodiments configuration files 142 and 146 may be stored only in central repository 152.

It is further noted that in one embodiment, domain administration server 150 may be located on a node 120A-B along with one or more of servers 130A-D.

Figure 2:
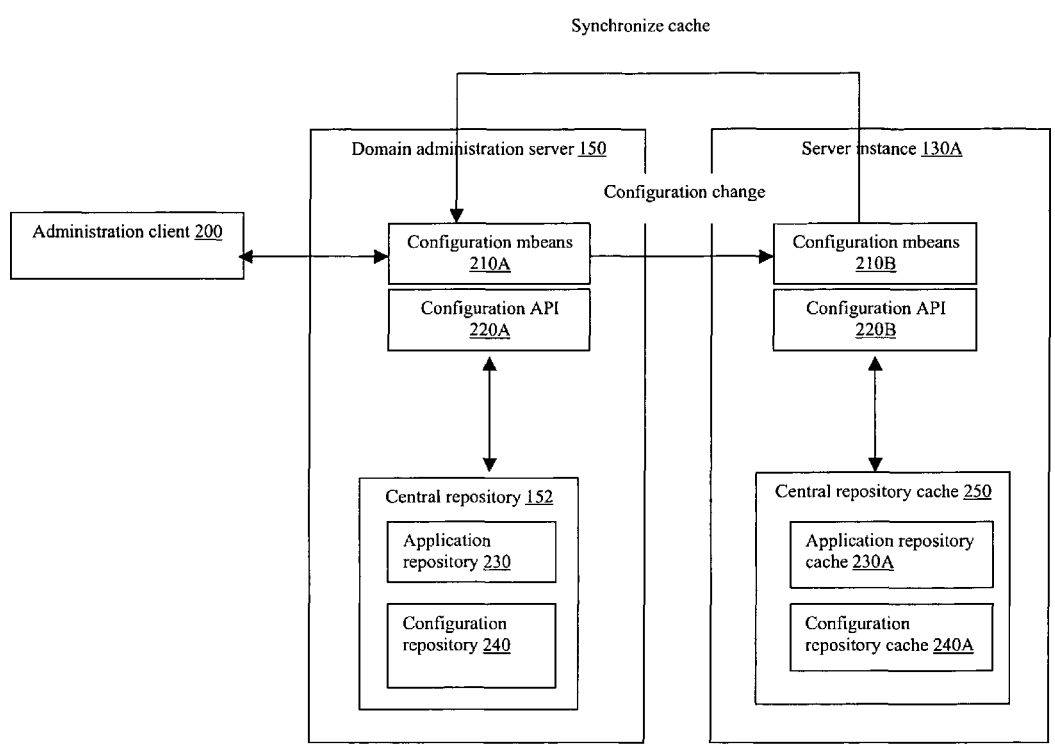
FIG. 2 is a block diagram illustrating another embodiment of a distributed system.

Turning now to FIG. 2, a block diagram of another embodiment of domain administration server 150 and cluster member server 130A is illustrated. As described above, domain administration server 150 is operable to control the deployment and configuration of one or more application servers 130. Specifically, domain administration server is coupled via a network to server instance 130A, and may execute or interact with administration client 200 to modify the configuration of one or more application server instances, as will be described below.

Domain administration server 150 may maintain central repository 152, as described above. Central repository 152 may contain application repository 230, which may contain one or more applications and associated configuration files for each application. For example, in one embodiment application repository 230 may contain extended markup language (XML) configuration files which contain parameters needed for the operation of an associated server and/or application, such as IP address, server port, control parameters, cluster configuration, hardware configuration, or other parameters. Furthermore, as will be described in further detail below, in one embodiment configuration repository 240 may represent a group of server configuration files, each of which is associated with a specific type of server configuration such as hardware, application, or cluster configuration.

In one embodiment the configuration files within application repository 230 and configuration repository 240 may be directly editable by an end user using a text editing application, while in another embodiment the repositories may be edited by one or more programs. For example, in one embodiment domain administration server 150 may implement a configuration mbeans 210A and configuration API 220A. Configuration API 220A may be an application program interface to central repository 152 operable to modify the contents of central repository 152, including application repository 230 and configuration repository 240. Configuration mbeans 210A may be a set of management values and functions following the Java Management Extension (JMX) standard, operable to allow an administration client to modify configuration repository 240 in central repository 152, as will be described below. It is noted that in one embodiment, configuration mbeans 210A may be an abstract set of functions and values interoperable with a wide variety of external programs, while configuration API 220A may be a platform-specific set of functions operable primarily by configuration mbeans 210A.

In one embodiment, administration client 200 may be a command line interface (CLI) or graphical user interface (GUI) which executes on domain administration server 150. Alternatively, administration client 200 may execute on another computer and interact with domain administration server 150. Administration client 200 may be operable to modify one or more configuration files in central repository 152 by interacting with configuration mbeans 210A. For example, administration client 200 may be a GUI operable to display the various data fields and values of configuration files in configuration repository 240. An end user may change the value of a specific field in the GUI, causing administration client 200 to interact with configuration mbeans 210A, causing configuration mbeans 210A to modify a configuration file via configuration API 220.

Domain administration server 150 may be coupled to one or more servers 130 executing on one or more nodes 120, as described above. Specifically, in one embodiment domain administration server 150 may be coupled to a server 130A. Server 130A may contain configuration mbeans 210B and a configuration API 220B similar to components 210A and 220A, as described above. Server 130A may also contain a central repository cache 250. Central repository cache 250 may be operable to contain local versions of one or more applications and associated configuration files, stored in application repository cache 230A and configuration repository cache 240A. It is noted that in various embodiments, central repository cache 250 may provide for more efficient data retrieval by providing a locally cached copy of one or more applications and configuration files to server 130A. Central repository cache 250 may also advantageously provide for a more highly available system by making applications and configuration files available to server 130A during periods when central repository 152 is unavailable.

As will be described below, in one embodiment application repository cache 230A and configuration repository cache 240A may be substantially similar to application repository 230 and configuration repository 240, while in another embodiment, application repository cache 230A and configuration repository cache 240A may be substantially different from application repository 230 and configuration repository 240. Specifically, domain administration server 150 may be operable to execute a method allowing for the establishment of a configuration model residing in central repository 152.

This model may then be associated with one or more repository caches such as 230A and 240A. In one embodiment, domain administration server 152 acting in accordance with administrative client 200 may be operable to modify the configuration associated with one or more specific application instances, as will be described in further detail below. In one embodiment, configuration changes from domain administration server 150 may be propagated to a server in response to an update of a configuration file in central repository 152, while in another embodiment, changes from domain administration server 150 may be propagated to a server in response to a restart of an application instance.

Figure 3:
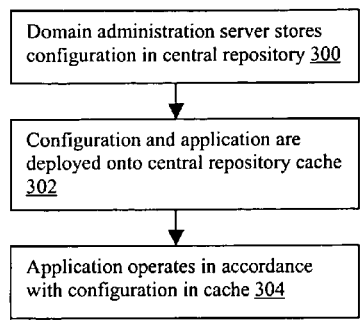
FIG. 3 is a flow diagram illustrating one embodiment of a method for deploying configuration information.

FIG. 3 is a flow diagram illustrating one embodiment of a method for deploying an application and configuration onto a server instance, as described above. Referring collectively now to FIGS. 1-2, in 300 domain administration server 150 stores configuration information in central repository 152. As described above, this configuration information may be stored in configuration repository 230, and may be manually edited by an end user or edited with administration client 200 via configuration mbeans 210A and configuration API 220A. In one embodiment, the configuration information may provide a base model for the configuration of all instances of an application on one or more server clusters.

In 302 the configuration information may be deployed from central repository 152 to a central repository cache 250 by domain administration server 150. In one embodiment, domain administration server 150 may retrieve the configuration information from central repository 150 and install the configuration information on central repository cache 250 by interacting with configuration mbeans 210A and 210B, respectively.

As described above, domain administration server 150 may be operable to make one or more changes to a deployed configuration file. For example, domain administration server 150 may install a configuration file on two servers executing on the same node. Each server may be running an application instance that requires a unique network port. Accordingly, when installing the configuration model on one of the servers, domain administration server 150 may modify the network port parameter in the configuration file stored in central repository cache 250. In 304 the application instance acts in accordance with the associated configuration file, as described above.

It is noted that in one embodiment, the system and method described above in FIGS. 2 and 3 may provide for a configuration template applicable to multiple different types of hardware. For example, a vendor may provide a partial configuration file 142 with name-pair values specific to that hardware platform already filled out. The user may then be able fill in the application and installation specific parameters such as IP address without having to concern themselves unduly with hardware-specific settings. A single server configuration may therefore be applicable across many different hardware platforms (Solaris, x86 Linux, etc.)

Likewise, the system and method described above may provide the ability to run multiple servers off of a single common configuration, which may be a "known good" configuration, thereby minimizing the effort needed to configure a system. For example, a tried-and-tested cluster configuration from an older cluster may be copied to and utilized on a newly assembled server cluster, thereby providing a simpler, more stable configuration mechanism.

It is further noted that in one embodiment, one or more configurations may be stored in central repository 152 without being associated with a specific server instance. This may provide end users with the ability to store one or more alternate configurations and associate those alternate configurations with a specific application or server instance as needed. Furthermore, as described immediately above, a "known good" configuration may be stored indefinitely in central repository 152 and associated with a plurality of new clusters or nodes as those systems are added. This feature may be specifically useful when capacity is expanded on a regular basis, such as when additional blades are added to a server rack system.

It is also noted that servers clusters may be configured and modified as part of one or more user-defined, arbitrary groups. For example, a plurality of clusters may each contain one or more nodes of a specific hardware type, i.e. each cluster may contain a single x86 Linux node of a specific make and configuration. An end user may be able to modify each of these servers in a simple, straightforward manner by creating an aggregate configuration group that cuts across cluster boundaries. The user may then be able to perform a single configuration operation on all of the nodes in the aggregate configuration group, such as patching a software flaw specific to these servers, without repeating the configuration for each individual node or cluster. Configuration of the entire system may thus be made simpler and more efficient.

Figure 4A:
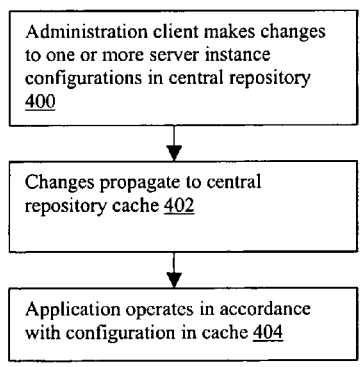
FIG. 4a is a flow diagram illustrating one embodiment of a method for deploying configuration information from a central repository.

Turning now to FIG. 4a, a flow diagram illustrating one embodiment of a method for propagating a configuration change to one or more server instances is shown. In 400 a configuration file may be modified by an end user or by application client 200, as described above. It is noted that in one embodiment the change may comprise a name-value pair, wherein the name represents the data field in the configuration file to be changed, and the value represents the new configuration value which may override the old configuration value. In one embodiment the name-value pair may represent an xpath expression, and in a further embodiment, the central repository 152 may maintain a file listing all overriding xpath expressions for later retrieval, as will be described below.

It is further noted that in one embodiment administrative client 200 may be operable to allow an end user to modify one or more name-value pairs for one or more specific application instances, one or more clusters, or any other group of servers. In one embodiment any name-value pairs not specifically overridden may remain the same between central repository 152 and central repository cache 250.

In 402 the changed value may be propagated to central repository cache 250 by domain administration server 150, as described above. In one embodiment cached configuration repository cache 240A may be directly modified with the overridden variable, while in another embodiment central repository cache 250 may maintain a separate file of all xpath expressions which override the values in cached configuration repository 240A. It is noted that in one embodiment, an application instance may read the cached configuration file and any overriding configuration changes from central repository cache 250 at startup, as will be described below. In 404 the server and/or application instances operates in accordance with the cached configuration, as described above.

Figure 4B:
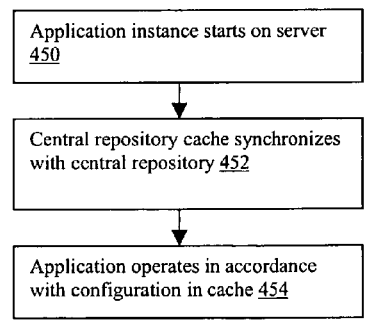
FIG. 4b is a flow diagram illustrating one embodiment of a method for synchronizing a central repository cache.

Turning now to FIG. 4*b*, a flow diagram illustrating one embodiment of a method for synchronizing central repository cache 250 with central repository 152 is shown. In 450 an application instance starts or is restarted on a server. In one embodiment, the application instance may immediately read the cached configuration file from central repository cache 250 upon startup, while in another embodiment the application may wait for the rest of the method to complete before reading the configuration information. It is noted that in one embodiment a server and/or application instance may read the cached configuration file if central repository 152 is unavailable.

In 452 central repository cache 240 synchronizes with central repository 152. In one embodiment server 130A may utilize configuration mbeans 210A and 210B to read overriding xpath expressions from central repository 152 and store the xpath expressions in central repository cache 250, as described above. It is again noted that in one embodiment, an application instance may read the updated configuration information after the synchronization is complete. In 454 the application instance operates in accordance with the cached configuration, as described above.

Figure 5:
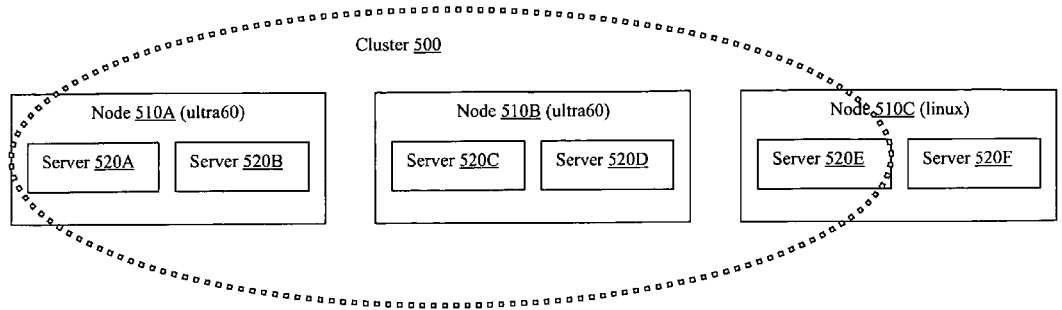
FIG. 5 is a block diagram illustrating one embodiment of a server cluster and standalone server instance.

Turning now to FIG. 5, a block diagram of an exemplary organization of clusters and servers is illustrated. As shown in FIG. 5, cluster 500 may contain a plurality of servers 520A-E on a plurality of nodes 510A-C. It is noted that nodes 510A and B may be one type of platform, such as Sun Solaris running on an Ultra 60 processor, while node 510C may be another type of platform, such as Linux running on an x86 processor. In one embodiment all the servers 520A-E in cluster 500 may be executing one application, while standalone server 520F may execute a second application, as will be described below.

Figure 6:
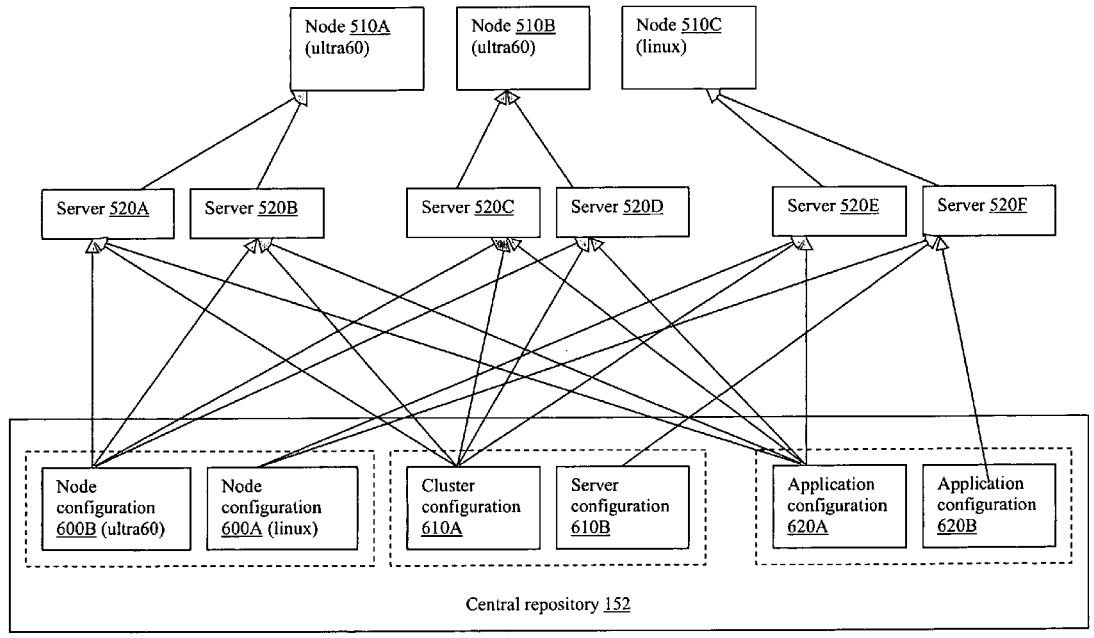
FIG. 6 is a block diagram illustrating one embodiment of configuration association.

FIG. 6 is a block diagram illustrating how various types of configurations may be associated with a plurality of server instances. As described above, configuration repository 240 may comprise a plurality of configuration files, each of which represents a different type of configuration, such as hardware, software, or cluster configuration. It is noted that in one embodiment, each configuration file may be stored in central repository 152, and may be associated.

For example, the set of nodes 510A-C and servers 520A-F illustrated in FIG. 6 may be associated with two hardware configurations, 600A and 600B. 600A may contain configuration information applicable to executing a server instance 520 on an Ultra 60 processor, while 600B may contain configuration information applicable to executing a server instance 520 on an x86 processor executing Linux. Accordingly configuration 600A may be associated with or loaded on all servers 520A-D executing on Ultra 60 nodes 510A and 510B, while configuration 600B may be associated with servers 520E-F, which execute on a Linux platform.

Likewise, cluster configuration 610A may contain information for all servers 520A-E executing in cluster 500, while server configuration 510B may contain information for standalone server instance 520F. Application configuration 520A may be applicable to servers 520A-E executing a first application, as described above, while application configuration 520B may be applicable to server 520F executing a second application. It is noted that all servers in a common cluster may contain instances of the same application, so servers 520A-E may each be associated with the same application configuration 520A and cluster configuration 510A, whereas standalone server 520F may be the only server associated with application configuration 520B and server configuration 510B. It is further noted that the configuration system as described above may allow for various types of servers to be associated with the appropriate configuration information files.

It is noted that the systems and methods described above in FIGS. 1-6 may provide an improved method for deploying and configuring application instances on one or more server clusters. By allowing a model configuration with instance-specific modifications to be deployed to multiple server instances, the configuration deployment method of FIGS. 3, 4*a*, and 4*b* may further allow for a simplified mechanism for configuration management, and the ability to more easily manage a variety of hardware and software configurations from a central location. Specifically, by templatizing one or more configuration files, support for different server and blade systems may be more easily provided. In addition, various operations may be performed on arbitrary groups of servers, or without any specific server target.

Figure 7:
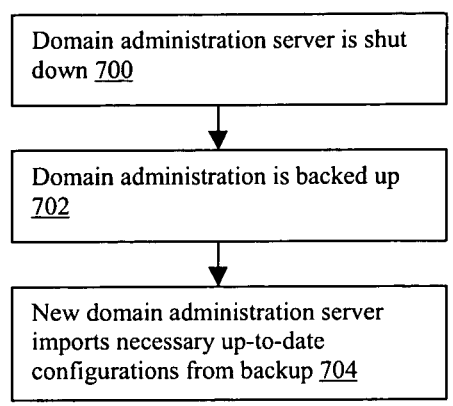
FIG. 7 is a flow diagram illustrating one embodiment of a method for restoring a domain administration server.

Turning now to FIG. 7, a flow diagram illustrating one embodiment of a method for restoring domain administration server 150 is shown. In 700, domain administration server 150 is shut down by an administrator. In 702, the administrator backs up central repository 152 to an external location. It is noted that in one embodiment, central repository 152 and central repository cache 250 may both represent up-to-date configurations, since no further configurations may be deployed without a running domain administration server. Accordingly, correlation between the backup files and central repository 152 may be ensured.

In 704, the administration instructs a new server to import the necessary files from the backup location to reconstitute the central repository 152. In one embodiment, the necessary files may be retrieved from a backup of the previous domain administration server, according to a properties file stored in the backup. The retrieved files may then be placed on the new server according to the properties file, or placed in a default directory in various embodiments.

Once the central repository is restored on the new server, the new server may be able to fully assume all the functions of a domain administration server 150. It is thus noted that, due to the distributed nature of the configuration information in the distributed system, even a migration of the domain administration server is possible.

Figure 8:
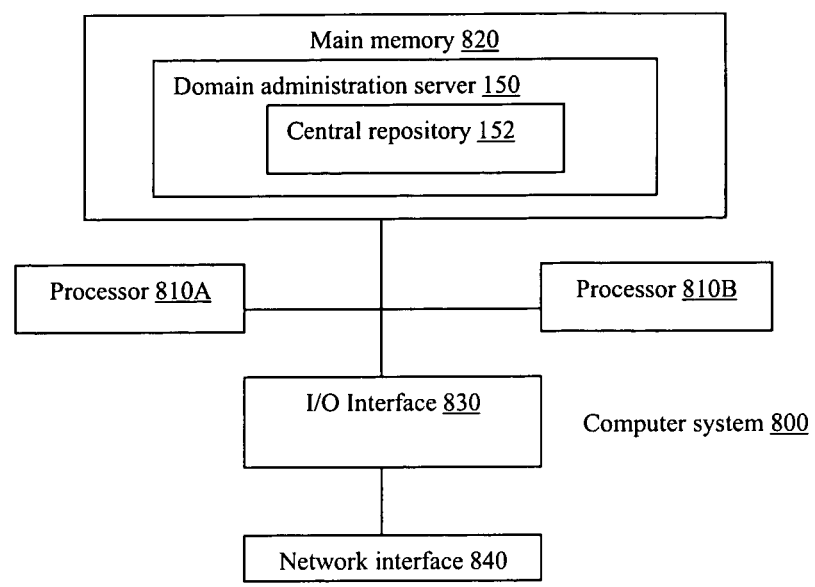
FIG. 8 illustrates an exemplary computer subsystem for implementing a central domain for server/cluster configuration, according to one embodiment.

Turning now to FIG. 8, an exemplary computer subsystem 800 is shown. Computer subsystem 800 includes main memory 820, which is coupled to multiple processors 810A-B, and I/O interface 830. It is noted that the number of processors is purely illustrative, and that one or more processors may be resident on the node. I/O interface 830 further connects to network interface 840. Such a system is exemplary of a load balancer, a server in a cluster or any other kind of computing node in a distributed system. Such a system may also be exemplary of nodes 120A-B, as described in FIG. 1.

Processors 810A-B may be representative of any of various types of processors such as an x86 processor, a PowerPC processor or a CPU from the SPARC family of RISC processors. Likewise, main memory 820 may be representative of any of various types of memory, including DRAM, SRAM, EDO RAM, DDR SDRAM, Rambus RAM, etc., or a non-volatile memory such as a magnetic media, e.g., a hard drive, or optical storage. It is noted that in other embodiments, main memory 800 may include other types of suitable memory as well, or combinations of the memories mentioned above.

As described in detail above in conjunction with FIGS. 1-7, processors 810A-B of computer subsystem 800 may execute software configured to execute a method for configuring a server based on a configuration template. The software may be stored in memory 820 of computer subsystem 800 in the form of instructions and/or data that implement the operations described above.

For example, FIG. 8 illustrates server 130A and an application stored in main memory 820. The instructions and/or data that comprise domain administration server 150 and central repository 152 may be executed on one or more of processors 810A-B, thereby implementing the various functionalities of domain administration server 150 and central repository 152 as described above.

In addition, other components not pictured such as a display, keyboard, mouse, or trackball, for example may be added to computer subsystem 800. These additions would make computer subsystem 800 exemplary of a wide variety of computer systems, such as a laptop, desktop, or workstation, any of which could be used in place of computer subsystem 800.

Various embodiments may further include receiving, sending or storing instructions and/or data that implement the operations described above in conjunction with FIGS. 1-7 upon a computer readable medium. Generally speaking, a computer readable medium may include storage media or memory media such as magnetic or optical media, e.g. disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
storing, in a central domain repository of a domain administration server, one or more base configuration files, wherein the one or more base configuration files are deployable from the central domain repository to a plurality of servers to configure the plurality of servers as a server cluster such that each server of the plurality of servers executes a same application;
configuring each of the plurality of servers to operate collectively as a server cluster according to one or more of the base configuration files deployed from the domain administration server to each of the plurality of servers such that each server of the plurality of servers is configured to execute the same application, wherein client requests for the same application are distributed to different servers of the plurality of servers, and wherein said configuring of each server is performed in response to a configuration change made at the domain administration server or in response to a restart at a respective server of the plurality of servers;
executing the same application on the plurality of servers in accordance with the cluster configuration; and
making an instance-specific modification to one of the one or more base configuration files of the central domain repository for a specific server of the plurality of servers and subsequently propagating the instance-specific modification to the specific server in response to said making the instance-specific modification or in response to a restart, wherein the instance-specific modification overrides a configuration value in the one of the one or more base configuration files for the specific server of the plurality of servers, wherein the specific server of the plurality of servers operates according to the overridden configuration value, and wherein the overridden configuration value does not apply to others of the plurality of servers.

2. The method as recited in claim 1, wherein the one or more base configuration files comprise a plurality of configuration files from a common template configuration file for the cluster.

3. The method as recited in claim 2, wherein the configuration files from a common template configuration file comprise configuration files for different hardware platforms to configure the different hardware platforms to operate within the same cluster.

4. The method of claim 1, further comprising making one or more changes to the one or more base configuration files in the central domain repository and propagating the one or more changes to the plurality of servers to reconfigure the plurality of servers as a group.

5. The method of claim 1, further comprising performing one or more operations on one of the base configuration files in the central domain repository for the cluster without targeting any of the plurality of servers for the one or more operations.

6. The method of claim 5, wherein said performing one or more operations comprises making one or more changes to one of the base configuration files in the central domain repository for the cluster without affecting the configuration of the plurality of servers.

7. The method as recited in claim 5, wherein said performing one or more operations comprises testing one of the base configuration files to determine that it is a known good configuration.

8. The method as recited in claim 7, wherein said configuring a plurality of servers as a cluster according to one of the base configuration files from the central domain repository comprises re-using the known good configuration for the plurality of servers.

9. The method of claim 1, wherein the one or more base configuration files are extended markup language (XML) files.

10. The method of claim 9, wherein the instance-specific modification is indicated by an xpath expression.

11. The method of claim 10, further comprising storing the xpath expression in the central domain repository.

12. A system, comprising:
a domain administration server operable to:
deploy one or more base configuration files stored in a central domain repository from the central domain repository to each server of a plurality of servers to configure the plurality of servers as a server cluster such that each server of the plurality of servers executes a same application;

configure each server of the plurality of servers to operate collectively as a server cluster according to one or more of the base configuration files deployed by the domain administration server from the central domain repository to each of the plurality of servers such that each server of the plurality of servers is configured to execute the same application, wherein client requests for the same application are distributed to different servers of the plurality of servers, and wherein the configuring of each server is performed in response to a configuration change made at the domain administration server or in response to a restart at a respective server of the plurality of servers;

wherein the one or more base configuration files comprise a plurality of configuration files from a common template configuration file for the cluster;

wherein the configuration files from the common template configuration file comprise configuration files for different hardware platforms to configure the different hardware platforms to operate within the same cluster; and wherein the plurality of servers include two or more servers having different hardware platforms, wherein the plurality of servers including the two or more servers having different hardware platforms are configured according to the configuration files from the central domain repository to execute the same application in accordance with the cluster configuration.

13. The system of claim 12, wherein the domain administration server is further operable to make one or more changes to the one or more base configuration files in the central domain repository and propagate the one or more changes to the plurality of servers to reconfigure the plurality of servers as a group.

14. The system of claim 12, wherein the domain administration server is further operable to perform one or more operations on one of the base configuration files in the central domain repository for the cluster without targeting any of the plurality of servers for the one or more operations.

15. The system of claim 14, wherein the domain administration server is operable to perform said one or more operations by making one or more changes to one of the base configuration files in the central domain repository for the cluster without affecting the configuration of the plurality of servers.

16. The system as recited in claim 14, wherein said one or more operations comprise testing one of the base configuration files to determine that it is a known good configuration.

17. The system as recited in claim 16, wherein the domain administration server is operable to configure said plurality of servers as a cluster according to one of the base configuration files from the central domain repository by re-using the known good configuration for the plurality of servers.

18. The system as recited in claim 12, wherein one of the servers is configured to make one or more instance-specific modifications to the base configuration files.

19. The system of claim 18, wherein the one or more base configuration files are extended markup language (XML) files.

20. The system of claim 19, wherein the one or more instance-specific modifications are indicated by xpath expressions.

21. The system of claim 20, wherein the domain administration server is operable to store the xpath expressions in the central domain repository.

22. A computer readable storage medium storing program instructions executable to implement a method comprising:

storing, in a central domain repository of a domain administration server, one or more base configuration files, wherein the one or more base configuration files are deployable from the central domain repository to a plurality of servers to configure the plurality of servers as a server cluster such that each server of the plurality of servers executes a same application;

configuring each of the plurality of servers to operate collectively as a server cluster according to one or more of the base configuration files deployed from the domain administration server to each of the plurality of servers such that each server of the plurality of servers is configured to execute the same application, wherein client requests for the same application are distributed to different servers of the plurality of servers, and wherein said configuring of each server is performed in response to a configuration change made at the domain administration server or in response to a restart at a respective server of the plurality of servers;

executing the same application on the plurality of servers in accordance with the cluster configuration; and making an instance-specific modification to one of the one or more base configuration files of the central domain repository for a specific server of the plurality of servers and subsequently propagating the instance-specific modification to the specific server in response to said making the instance-specific modification or in response to restarting an application instance, wherein the instance-specific modification overrides a configuration value in the one of the one or more base configuration files for the specific server of the plurality of servers, wherein the specific server of the plurality of servers operates according to the overridden configuration value, and wherein the overridden configuration value does not apply to others of the plurality of servers.

23. The computer readable storage medium as recited in claim 22, wherein the one or more base configuration files comprise a plurality of configuration files from a common template configuration file for the cluster.

24. The computer readable storage medium as recited in claim 23, wherein the configuration files from a common template configuration file comprise configuration files for different hardware platforms to configure the different hardware platforms to operate within the same cluster.

25. The computer readable storage medium of claim 22, wherein the method further comprises making one or more changes to the one or more base configuration files in the central domain repository and propagating the one or more changes to the plurality of servers to reconfigure the plurality of servers as a group.

26. The computer readable storage medium of claim 22, wherein the method further comprises performing one or more operations on one of the base configuration files in the central domain repository for the cluster without targeting any of the plurality of servers for the one or more operations.

27. The computer readable storage medium of claim 26, wherein said performing one or more operations comprises making one or more changes to one of the base configuration files in the central domain repository for the cluster without affecting the configuration of the plurality of servers.

28. The computer readable storage medium as recited in claim 26, wherein said performing one or more operations comprises testing one of the base configuration files to determine that it is a known good configuration.

29. The computer readable storage medium as recited in claim 28, wherein said configuring a plurality of servers as a cluster according to one of the base configuration files from the central domain repository comprises re-using the known good configuration for the plurality of servers.

30. The computer readable storage medium of claim 22, wherein the one or more base configuration files are extended markup language (XML) files.

31. The computer readable storage medium of claim 30, wherein the instance-specific modification is indicated by an xpath expression.

32. The computer readable storage medium of claim 31, the method further comprising storing the xpath expression in the central domain repository.

* * * * *

UNITED STATES PATENT AND TRADEMARK OFFICE
CERTIFICATE OF CORRECTION

PATENT NO. : 8,984,101 B1  
APPLICATION NO. : 10/787468  
DATED : March 17, 2015  
INVENTOR(S) : Viswanath et al.

Page 1 of 1

It is certified that error appears in the above-identified patent and that said Letters Patent is hereby corrected as shown below:

In the specification

In column 3, line 12, delete "140-D" and insert -- 140A-D --, therefor.

Signed and Sealed this
Third Day of November, 2015

Michelle K. Lee
*Director of the United States Patent and Trademark Office*